2,812,320

METHOD AND COMPOSITION FOR COUNTERACTING SULFUROUS ODORS IN A PHOSPHORUS SULFIDE-HYDROCARBON REACTION PRODUCT

Leonard E. Beare, Lansing, Ill., assignor to Sinclair Refining Company, New York, N. Y., a corporation of Maine No Drawing. Application January 4, 1956,
Serial No. 557,258

8 Claims. (Cl. 260—139)

This invention relates to the deodorization of lubricating oil additives, and in particular to the deodorization of phosphorus sulfide-hydrocarbon reaction products. This invention further relates to the deodorization of mineral oils containing these additives, including lubricating oil compositions and oil additive concentrates, whereby objectionable sulfurous odors are effectively counteracted.

As indicated in the art, one class of additives designed for use to impart extreme pressure properties to mineral oils comprises the oil-soluble reaction products of phosphorus sulfide and a hydrocarbon. In general, these additives are prepared by the reaction of phosphorus sulfide with a hydrocarbon oil, such as residual lubricating oil, olefin or olefin polymer, or distillate lubricating oil, at a temperature of about 200 to 500° F. The reaction is usually carried out in a non-oxiding atmosphere and the reaction products are frequently neutralized with a basic material such as a hydroxide or oxide of an alkali or alkaline earth metal. Unfortunately, however, the reaction by which these additives are prepared is such that the evolution of H₂S and possibly other materials giving objectionable sulfurous odors is not completed during the manufacturing procedure, but slowly continues during the storage of the additives or mineral oil compositions containing the additives. Consequently, much difficulty has been met in counteracting the slow evolution of odorus materials and many attempts to overcome this evolution by prolonged steaming, air blowing and solvent dehydration have proved relatively ineffective. Even the use of expensive perfumes or masking chemicals have met with little or no success since these chemicals do not destroy objectionable odors but offset them with a stronger odor, which, in many instances, is more objectionable than the original sulfurous odors.

I have discovered that when certain phosphorus-sulfide hydrocarbon reaction products are treated with a small amount of trioxane, preferably as a final step in their manufacture and after hydrogen sulfide evolution is substantially complete, objectionable sulfurous odors are effectively counteracted over long periods of storage. Although the exact mechanism whereby the phosphorus sulfide-hydrocarbon reaction products are deodorized is not completely understood, it appears that the effectiveness of trioxane is due to a balance between the decomposition rate of trioxane to formaldehyde in the presence of acidic phosphorus additives and the very slow further decomposition of the phosphorus additive to release small amounts of hydrogen sulfide.

The phosphorus containing additives which may be treated in accordance with this invention include a wide variety of phosphorus sulfide-hydrocarbon reaction products. In the preparation of these additives a suitable hydrocarbon material is reacted with about 5 to 25% phosphorus sulfide at a temperature between about 200 and 500° F. until the evolution of hydrogen sulfide is substantially complete. Ordinarily, the phosphorus sulfide which is employed with the hydrocarbon material is phosphorus pentasulfide, $P_2S_5$, although $P_2S_3$, $P_4S_7$ or other phosphorus sulfides can be used. The reaction is frequently carried out in a non-oxidizing atmosphere, such as an atmosphere of nitrogen, and insoluble reaction products can be separated from the reaction mixture by means of filtration or centrifugation as at an elevated temperature, preferably at a temperature of about 150 to 280° F., if necessary. The reaction product is then blown vigorously with steam as at a temperature of about 300 to 330° F., until substantially all the hydrogen sulfide has been removed.

In the present invention it has been found necessary to employ in the preparation of the phosphorus sulfide reaction products, heavy hydrocarbon oils of lubricating viscosity having a molecular weight above about 500 such as residual lubricating oils and cylinder stocks. The hydrocarbon oil constituent may also be an olefin polymer having a molecular weight ranging upwards from about 500 to a molecular weight of 2000 or more. These polymers can be obtained by the liquid phase polymerization of butylene and isobutylene at a temperature from about —80° F. to 100° F. in the presence of a Freidel-Crafts type catalyst.

As it is believed that the effectiveness of trioxane is due at least in part to the acidic nature of the particular additive treated, it is important that the phosphorus sulfide-hydrocarbon reaction product be steam treated following the separation of insoluble reaction materials. Furthermore, the reaction product must remain unneutralized.

The preferred phosphorus sulfide-hydrocarbon reaction products which may be treated in accordance with this invention are of the type described and embodied in my U. S. Patent 2,715,612. These additives are steam-treated, unneutralized reaction products which are prepared by reacting about 7 to 17 parts of phosphorus pentasulfide with about 90 to 85 parts of a residual lubricating oil. After about 10 to 15 hours of heating at a temperature of about 400 to 500° F., the insoluble reaction products are separated and the remaining mixture is blown with steam until only trace amounts of H₂S are evolved. It is important that the oil insoluble products be separated from the reaction mixture at an elevated temperature i. e., 150–280° F., since this effects the removal of materials which would otherwise become oil soluble and pro-sludging after the steam treatment. The final product is then cooled and "cut back" by addition of a small amount of hydrocarbon oil to provide an additive containing the desired amount of phosphorus.

In carrying out the process of my invention a minor amount of trioxane sufficient to provide a substantial deodorizing effect, preferably about 0.5 to 2.5 weight percent based on the total weight of the phosphorus sulfide-hydrocarbon reaction product, is mixed with the reaction product which is then heated to a temperature between about 125° F. and 175° F. The use of temperatures above about 175° F. has been found undesirable since an excessive amount of trioxane is decomposed to formaldehyde and apparently reacts in other than the preferred manner to produce a new type of objectionable sour odor. This also decreases the long time efficiency of the process by reducing the amount of trioxane available for gradual decomposition during storage of the additive at room temperature. The reaction mixture is usually heated for a period of at least about one-half hour or more, and the product is then cooled and stored for subsequent use as the phosphorus component in a variety of lubricant compositions.

In deodorizing mineral oil lubricants which generally contain about 0.1 to 10 weight percent of the reaction product or mineral oil concentrates containing more than about 50 weight percent of the additive, the treating conditions and the percentage of trioxane employed based on the sulfide-hydrocarbon reaction product are substantially the same as above. The concentrates are then used for blending with a hydrocarbon oil or other oils in the proportion desired for the particular conditions of use.

The following examples serve to illustrate the present invention and are not to be considered as limiting its scope.

Example I

A phosphorus sulfide-hydrocarbon reaction product was prepared as follows:

A tared 5 liter flask equipped with a mechanical stirrer, stirrer seal and reflux condenser was charged with 2884 grams of a solvent treated Mid-Continent bright stock. The contents were heated to 280° F. with air while stirring to insure that no moisture was present. Then 416 grams of phosphorus pentasulfide were added and the mixture heated to a reaction temperature of 440° F. over a period of 2 hours. Stirring was continued at reaction temperature of 440° F. for 14 hours and the product cooled and checked for weight change during reaction. One percent of filter aid was added. The preparation was reheated to 280° F. with stirring and filtered into a clean 5 liter flask. One half gram of Dow Corning Fluid 200-anti-foam was added and the preparation was reheated to 300° F. with stirring. The mixture was mechanically stirred and blown vigorously with steam for five hours at temperatures of 300–320° F. The steam was shut off and dry air was admitted to the flask above the liquid level. Stirring was continued at 320–330° F. for 20 minutes. The product gave the following analysis.

| | |
|---|---|
| Acid number | 68.8 |
| Saponification number | 84.3 |
| Sulfur percent | 1.64 |
| Phosphorus do | 2.99 |

Example II 98.5 parts of a steam-treated reaction product prepared essentially as in Example I were heated with 1.5 parts of trioxane at 150° F. for 60 minutes with stirring in an enclosed container. The product was allowed to cool and checked for odor. An odor of formaldehyde was detected. A strip of moist lead acetate paper was suspended in the enclosed container above the liquid for five minutes with no appreciable discoloration. The slight amount of formaldehyde in the flask was blown out with air, leaving an odor characteristic of trioxane. On storage at room temperature for 3 months no detectable amount of hydrogen sulfide was evolved.

Example III 99.25 parts of the steam-treated reaction product prepared essentially as described in Example I were treated with 0.75 part of trioxane in the same manner as in Example II above. A strip of moist lead acetate paper was suspended in a closed container above the liquid for five minutes with no appreciable discoloration. On further storage of the deodorized reaction product at room temperature for three months no detectable amount of hydrogen sulfide was evolved.

Example IV

A gear lubricant containing 91.32 parts of lubricating oil, 80 SUS at 210° F., 2.0 parts of the steam-treated reaction product prepared essentially as in Example I, 2.0 parts of chlorinated diphenyl, (60% Cl), 4.5 parts of sulfurized sperm oil (12% S), 0.15 part of lauric acid and 0.03 part of trioxane was stirred at 150° F. for one hour. Samples of this material have been inspected for $H_2S$ evolution and odor. No substantial sulfurous or formaldehyde odors have been detected at periods up to one year. The mild odor characteristic of free trioxane is present but, if desired, it is very easily covered up with a small amount of an odorant.

Example V

A tared 5 liter flask equipped with a mechanical stirrer, stirrer seal and reflux condenser, was charged with 2885 grams of a polyisobutylene product having a molecular weight of 1638. The contents were heated to 280° F. with air while stirring to insure that no moisture was present. 416 grams of phosphorus pentasulfide were added and the mixture heated to a reaction temperature of 440° F. over a period of 2 hours. Stirring was continued for 14 hours at reaction temperature and the product cooled and checked for weight change during reaction. Since the product was too viscous to filter at 280° F. and contained no suspended insolubles, it was heated to 300° F. and transferred directly to a clean flask for steaming. The mixture was mechanically stirred and blown with steam for five hours at a temperature between about 300 to 320° F. The steam was shut off and dry air was admitted to the flask above the liquid level. Stirring was continued at 320° F. to 330° F. for 20 minutes. The product analyzed as follows:

| | |
|---|---|
| Acid number | 52.18 |
| Saponification number | 54.90 |
| Sulfur percent | 1.02 |
| Phosphorus do | 2.48 |

99.25 parts of the steam-treated reaction product were then treated with .75 part of trioxane in accordance with the procedure set forth in Example II. A strip of moist lead acetate paper was suspended in the enclosed container above the liquid for five minutes with no appreciable discoloration. On storage at room temperature for 3 months no sulfurous odor was detected.

Example VI 2884 grams of a polyisobutylene product having a molecular weight of 358 were reacted with 416 grams of phosphorus pentasulfide in accordance with procedure of Example I and the product analyzed as follows:

| | |
|---|---|
| Acid number | 60.77 |
| Saponification | 78.82 |
| Sulfur percent | 4.75 |
| Phosphorus do | 4.13 |

The product was then treated with percentages of trioxane ranging from 0.75 to 3.0% in accordance with the procedure in Example II. The resulting composition exhibited an objectionable sulfurous odor over a substantial storage period. Thus the selection of a hydrocarbon of at least about 500 molecular weight for reaction with the phosphorus sulfide is apparently necessary if the desired odor improvement be effected.

The above examples illustrate the effectiveness of trioxane in preventing objectionable sulfurous odors in the reaction products of phosphorus sulfide with heavy hydrocarbon oil stocks. If industrial odorants are to be used in conjunction with the trioxane treatment, it is generally desirable to add the odorant after the treatment has been completed so as to avoid the possibility of destroying the odorant.

I claim:

1. The method of counteracting objectionable sulfurous odors of a steam-treated, unneutralized oil-soluble phosphorus sulfide-hydrocarbon reaction product prepared from a hydrocarbon oil of lubricating viscosity and having a molecular weight greater than about 500 which comprises heating said product in the presence of a minor amount of trioxane at a temperature from about 125 to 175° F., the amount of said trioxane being sufficient to substantially counteract said odors.

2. The method of claim 1 wherein the amount of trioxane is from about 0.5 to 2.5 weight percent based on the reaction product.

3. The method of claim 1 wherein said reaction product is obtained by reacting about 7 to 17 parts of phosphorus pentasulfide with about 90 to 85 parts of a petroleum residual lubricating oil at a temperature of about 400–500° F. and separating insolubles from the reaction mixture at an elevated temperature prior to steam treatment.

4. The method of claim 3 wherein the amount of trioxane is from about 0.5 to 2.5 weight percent based on the reaction product.

5. The composition prepared in accordance with the method of claim 1.

6. The composition prepared in accordance with the method of claim 2.

7. The composition prepared in accordance with the method of claim 3.

8. The composition prepared in accordance with the method of claim 4.

No references cited.